3,506,591
PREPARATION OF A POLYMERIZATION CATALYST COMPONENT
Louise D. Hague, Lancashire, Wilmington, Habet M. Khelghatian, Springfield, and James L. Jezl and John A. Price, Swarthmore, Pa. (all % Avisun Corporation, Marcus Hook, Pa. 19061)
No Drawing. Filed Aug. 24, 1966, Ser. No. 574,566
Int. Cl. C08f 3/02
U.S. Cl. 252—429                                1 Claim

ABSTRACT OF THE DISCLOSURE

A catalyst for the polymerization of olefins is prepared by reducing titanium tetrachloride with an excess of an alkyl aluminum dihalide, aging at 50–100° C., cooling, reacting with from 0.6 to 0.8 mol of a dialkyl aluminum halide per mol of Ti at 120–140° C., and complexing with from 0.15 to 0.5 mol of ethyl orthosilicate per mol of aluminum.

---

This invention relates to a method of preparing a catalyst component useful, when coordinated with an alkoxy silane, in the polymerization of alpha olefins to highly crystalline polymers.

John A. Price in French patent of addition 84,680 to Patent 1,349,887, which corresponds to United States application Ser. No. 288,884, now abandoned, discloses polymerization of alpha olefins with a catalyst consisting of ER titanium trichloride, an alkyl aluminum dihalide, and an alkoxy silane. According to the disclosure of this patent, the ER $TiCl_3$ is prepared by reducing $TiCl_4$ with ethyl aluminum dichloride at 10° C. for 10 minutes, agitating at room temperature for 1 hour, followed by aging at 100° C. for 16 hours. The proportions of $TiCl_4$ and ethyl aluminum dichloride, hereafter referred to as EADC, are such that the resultant slurry contains, after reduction, $TiCl_3 \cdot AlCl_3$ and an excess of EADC. This slurry, when complexed with an alkoxy silane, is effective to polymerize propylene and higher alpha olefins to crystalline polymers, at commercial rates, but leaves something to be desired in that the proportion of monomer converted to amorphous by-product polymer is undesirably high, and the bulk density of the powder produced is low. Low bulk density leads to difficulties in powder transfer, and requires large storage facilities for a given weight of polymer.

It is an object of this invention to provide a form of ER $TiCl_3$ which is superior to the ER $TiCl_3$ of Price in the following respects: catalytic activity, percentage of monomer converted to amorphous polymer, and in bulk density of the polymer powder.

One catalyst may be said to have a higher activity than another if, at a given catalyst level and under the same polymerization conditions, polymer is produced at a greater rate, expressed in weight per volume per unit of time. Another concept of activity is the ability of the more active catalyst to produce polymer at the same rate as the less active catalyst but at a lower catalyst level. The latter concept is of more importance in commercial operation, since in such an operation the reaction is carried out at the fastest rate possible, limited by the capacity of the cooling jacket of the reactor to remove heat of polymerization, until the slurry contains about 15 weight percent solid polymer. If the more active catalyst can maintain this rate at one half the concentration, compared to the less active catalyst, it is evident that the catalyst cost, per pound of polymer, is one half the cost using the less active catalyst.

We have found that the foregoing object may be attained by reducing $TiCl_4$ in an inert solvent with an alkyl aluminum dichloride at a temperature of −20° to 30° C. to form $TiCl_3 \cdot AlCl_3$, aging the slurry thus formed at 50°–100° C. for a period of time, then raising the temperature to 120°–140° C., adding sufficient dialkyl aluminum chloride to react with about two thirds of the $AlCl_3$ present to form alkyl aluminum dichloride, and holding the slurry at this temperature until the reaction is complete. The amount of the combined aluminum alkyls, and their proportions, are such that the final ratio of alkyl aluminum dichloride to titanium trichloride is from about 1:1 to about 4:1, and the chlorine to aluminum ratio in the supernatant liquor is at least 2:1. For example, 1.46 mol of EADC and one mol $TiCl_4$ may be reacted to yield theoretically one mol of $TiCl_3 \cdot AlCl_3$ plus 0.46 mol of EADC, and the product reacted with 0.67 mol of diethyl aluminum chloride (DEAC) to yield a mixture containing approximately one mol of $TiCl_3 \cdot 0.33$ $AlCl_3$ and 1.80 mol of EADC. The complete catalyst is then prepared by adding from 0.15 to 0.5 mol of ethyl orthosilicate per atom of aluminum present to the slurry, and aging at about 50° C. for an hour or two.

We have found that an ER $TiCl_3$ slurry prepared in the foregoing manner, when complexed with ethyl orthosilicate, will catalyze the polymerization of propylene to solid crystalline polymers at rates in the vicinity of 0.5 pound per gallon of solvent per hour at a catalyst level of 0.032 gram of $TiCl_3$ per 100 cc. of solvent, whereas with the ER $TiCl_3$ prepared according to the directions of the French patent, it is necessary to go to catalyst levels of from 0.064 to 0.084 gram per 100 cc. of solvent in order to achieve the same rate of polymerization, as is evident from Table I of the patent. Thus, ER $TiCl_3$ prepared in accordance with the present procedure is at least twice as active as the ER $TiCl_3$ disclosed in the patent, and the catalyst cost per pound of polymer produced is about one-half the cost using the ER $TiCl_3$ of the patent. The yield of amorphous by-product polymer is reduced from over 12 percent to about 7 percent or less, and the bulk density of the polymer is increased from about 8 to 15 pounds per cubic foot to in excess of 18 pounds.

The solvent used in the preparation of our new form of ER $TiCl_3$ may be any saturated hydrocarbon such as a high boiling paraffin oil, or lower boiling hydrocarbon such as heptane, octane, nonane, or methylcyclohexane. We prefer, however, mixtures of isoparaffinic hydrocarbons boiling between about 115°–180° C., since the bulk density of polymers made with catalysts comprising ER $TiCl_3$ made in these solvents is somewhat higher than that obtained with ER $TiCl_3$ prepared in other solvents. The concentration of $TiCl_4$ in the solvent during the reduction step should be in the vicinity of about 15 to 30 volume percent.

In order that those skilled in the art may more fully understand the nature of the invention and the method of carrying it out, the following controls and examples are given. In all instances the procedure used was to charge a one-gallon agitated autoclave with 2000 ml. of hexane and heat it to 160° F. under nitrogen pressure. The catalyst was then added and washed in with an additional 500 ml. of hexane, and the entire contents of the autoclave were brought to 160° F. while venting nitrogen to 5 p.s.i.g. The autoclave was then pressured with propylene, and polymerization was carried out while maintaining the initial pressure until 300 ml. of propylene had been consumed. The reaction was then stopped by addition of 600 ml. of methanol, and the reaction products were then worked up to recover the products. The solid crystalline polymer was recovered by filtration, and the hexane soluble amorphous polymer was recovered by evaporation of the solvent. The reaction rate was expressed in pounds of crystalline polymer per gallon of solvent per hour.

CONTROL 1

The catalyst was prepared according to the method disclosed by Price by mixing a heptane solution of ethyl aluminum dichloride with a solution of $TiCl_4$ in a mol ratio of EADC to $TiCl_4$ of 2:1. The mixture was then agitated at room temperature for one hour. It was then placed in a 100° C. bath and held at this temperature for 16 hours. It was then cooled, and diluted with heptane so that a 2 ml. aliquot would contain 1 millimol of $TiCl_3 \cdot AlCl_3$ and 1 millimol of unreacted EADC. Ethyl orthosilicate was then added in an amount such that the atomic ratio of Al to Ti to Si was 2:1:0.47, and the mixture was aged 1 hour at 52° C. Polymerization was then carried out as described above, at 100 p.s.i.g., propylene pressure, the catalyst level being 0.064 g. of $TiCl_3$ per 100 ml. of solvent. Crystalline polymer was produced at the rate of 0.36 pound per gallon per hour, and the bulk density of the dry polymer powder was 10 pounds per cubic foot. Of the total polymer, 14.6 percent was an amorphous polymer soluble in boiling pentane.

CONTROL 2

Control 1 was repeated, except that the catalyst level was 0.084 g. of $TiCl_3$ per 100 ml. of solvent. Crystalline polymer was produced at the rate of 0.51 pound per gallon per hour, and the bulk density of the polymer was 10.9 pounds per cubic foot. Of the total polymer, 12.5 percent was amorphous polymer soluble in boiling pentane.

CONTROL 3

Control 1 was repeated, except that the atomic ratio of Al to Ti to Si in the catalyst was 2:1:0.52. Rate of production of crystalline polymer was 0.34 pound per gallon per hour. The bulk density was 13.8 pounds per cubic foot, and 12.5 percent of the total polymer was pentane soluble.

EXAMPLE I

The catalyst was prepared by adding EADC to a solution of $TiCl_4$, in a mol ratio of EADC to $TiCl_4$ of 1.33:1, at a temperature of 22° C. over a period of one hour. The mixture was then brought to 135° C. in 15 minutes and 0.67 mol of DEAC per mole of $TiCl_4$ was added over a period of 45 minutes, followed by aging at this temperature for an additional 30 minutes. The mixture was then brought to room temperature, diluted, and an aliquot removed. Sufficient ethyl orthosilicate was added to bring the atomic ratio of Al to Ti to Si to 2:1:0.39. The mixture was then aged at room temperature for one hour. Polymerization was then carried out as described above, at 110 p.s.i.g. propylene pressure, at a catalyst level of 0.032 g. of $TiCl_3$. Rate of production of crystalline polymer was 0.42 pound per gallon per hour. The bulk density was 18.7 pounds per cubic foot, and only 7.2 percent of the total polymer was pentane soluble.

EXAMPLE II

Example I was repeated, excet that the aging after the addition of the ethyl orthosilicate was carried out at 50° C. Rate of production of crystalline polymer was 0.52 pound per gallon per hour. The bulk density was 18.2 pounds per cubic foot and of the total polymer, 9.6 percent was pentane soluble.

EXAMPLE III

Example II was repeated, except that the Al to Ti to Si ratio was 2:1:0.36. Rate of production was 0.49 pound per gallon per hour, pentane solubles were 6.7 percent, and bulk density was 18.7 pounds per cubic foot.

EXAMPLE IV

Example II was repeated except that the Al to Ti to Si ratio was 2:1:0.33. Rate of production was 0.31 pound per gallon per hour, pentane solubles were 6.8 percent, and bulk density was 22.5 pounds per cubic foot.

EXAMPLE V

The catalyst was prepared by mixing 23 volume percent solutions in paraffin oil of $TiCl_4$ and EADC at 30° C., in an amount such that the Al to Ti ratio was 1.46:1. The resultant slurry was aged at 100° C. for 30 minutes. Then 0.67 mol of DEAC per mol of $TiCl_3$ was added over a period of 30 minutes at 140° C., and the slurry was aged for an additional 15 minutes at 140° C. The slurry was cooled to room temperature, diluted, and an aliquot removed for polymerization. Sufficient ethyl orthosilicate was added to adjust the Al to Ti to Si ratio to 2.14:1:0.39. Using this catalyst to polymerize propylene at 108 p.s.i.g. propylene pressure, 160° F., and a catalyst level of 0.064 g. of $TiCl_3$ per 100 cc. of reaction medium, the rate was 0.32 pound per gallon per hour, pentane solubles were 4.6 percent, and the bulk density was 16.3 pounds per cubic foot.

Data for the following three examples was obtained in a 50 gallon pilot plant reactor, and rates are expressed as total pounds of polymer per gallon per hour, rather than pounds of crystalline polymer.

EXAMPLE VI

In this run the catalyst was prepared by reducing $TiCl_4$ with 2.05 mols of EADC per mol of $TiCl_4$ at −15° C. Then 0.31 mol of DEAC per mol of $TiCl_3$ was added at room temperature, and the mixture was held at this temperature overnight. The mixture was then aged for 2 hours at 120° C., cooled to room temperature, diluted, and an aliquot removed. Sufficient ethyl orthosilicate was added to give a mol ratio of Al to Ti to Si of 2.36:1:0.55. After aging, the catalyst was used to polymerize propylene at a level of 0.032 g. of $TiCl_3$ per 100 cc. of solvent under conditions described above. Rate of reaction was 0.53 pound per gallon per hour, and pentane soluble polymer amounted to 12.4 percent of the total. Bulk density was 19.4 pounds per cubic foot.

EXAMPLE VII

The catalyst was prepared by reduction of $TiCl_4$ with 1.49 mols of EADC at 0° C. Then 0.15 mol of DEAC per mol of $TiCl_3$ was added at room temperature and the mixture was then aged at 135° C. for 30 minutes, cooled to room temperature, a further 0.23 mol of DEAC was added and the mixture was again aged at 135° C. for 30 minutes. After cooling, the solution was diluted and an aliquot removed for polymerization. Sufficient ethyl orthosilicate was added to the aliquot to give a mol ratio of Al to Ti to Si of 1.87:1:0.39. After aging, the catalyst was used at a level of 0.032 g. of $TiCl_3$ per 100 cc. of solvent to polymerize propylene under the conditions as above. Rate was 0.49 pound of polymer per gallon per hour, pentane solubles were 8.6 percent, and bulk density was 20.4 pounds per cubic foot.

EXAMPLE VIII

The catalyst was prepared by reducing the $TiCl_4$ with 1.35 mols of EADC at 0° C. Thereafter 0.66 mol of DEAC were added at room temperature in three increments of 0.07 mol, 0.23 mol and 0.37 mol, with aging at 135° C. for 20 minutes following the first addition, at 135° C. for 30 minutes following the second addition, and again at 135° C. for 30 minutes following the third addition. After cooling, dilution, and removal of an aliquot for polymerization, sufficient ethyl orthosilicate was added to the aliquot to give a ratio of Al to Ti to Si of 2.01:1:0.46. After aging, the catalyst was used to polymerize propylene at a $TiCl_3$ level of 0.032 g. per 100 cc. of solvent at a rate of 0.45 pound of polymer per gallon per hour. 10.6 percent of the polymer was pentane soluble, and the bulk density was 21.2 pounds per cubic foot.

In the commercial polymerization of propylene to crystalline polymers the most commonly used titanium component of the catalyst is a titanium trichloride made by reducing $TiCl_4$ with aluminum to form mixed crystals of TiCl$_3$·0.33AlCl$_3$, and then grinding the material until substantially all of the original crystallinity, as determined by X-ray, has been destroyed. This form of TiCl$_3$ as shown by Price, is an efficient catalyst when combined with EADC and an alkoxy silane. As compared with the ER TiCl$_3$ of the present invention, rates, bulk densities, and pentane solubles are comparable at the same catalyst levels. However, the powder produced by the catalysts described herein is superior to the powder produced by catalysts comprising the aluminum-reduced TiCl$_3$ in that the amount of fine powder is much less, avoiding the dusting problem encountered in handling powder containing large amounts of fines. Typical screen analysis of powders prepared with both catalysts is shown in the following table.

TABLE 1.—POWDER SIZE IN MICRONS IN PERCENT ON SCREEN

| Ti component | 210 | 105 | 74 | <74 |
|---|---|---|---|---|
| ER | 44 | 33 | 8 | 15 |
| Aluminum reduced | 23 | 30 | 14 | 33 |

The invention claimed is:
1. A process for preparing a polymerization catalyst which comprises the steps of:
 (a) reducing titanium tetrachloride with a molar excess of an alkyl aluminum dichloride in an inert hydrocarbon solvent to produce a slurry containing titanium trichloride, aluminum trichloride and excess alkyl aluminum dichloride,
 (b) aging the slurry produced in step (a) at a temperature of from 50° to 100° C.,
 (c) adding, at a temperature of from about 120° C. to about 140° C., a dialkyl aluminum chloride in an amount equal to from 0.6 to 0.8 mol per mol of titanium trichloride, and aging at this temperature for a period of time sufficient to react the dialkyl aluminum chloride with the aluminum trichloride to form additional alkyl aluminum dichloride, and
 (d) complexing the alkyl aluminum dichloride with from 0.15 to 0.5 mol of ethyl orthosilicate per atom of aluminum present.

References Cited

UNITED STATES PATENTS

| 3,108,973 | 10/1963 | Vandenberg | 252—429 |
| 3,121,063 | 2/1964 | Tornqvist | 252—429 |
| 3,048,574 | 8/1962 | Wiberg | 260—93.7 |

FOREIGN PATENTS

| 84,680 | 2/1965 | France. |
| 886,085 | 1/1962 | Great Britain. |

DANIEL E. WYMAN, Primary Examiner
P. M. FRENCH, Assistant Examiner